United States Patent
Jeon

(10) Patent No.: US 9,398,271 B2
(45) Date of Patent: Jul. 19, 2016

(54) APPARATUS AND METHOD OF ALTERNATELY CAPTURING IMAGES WITH ROTATING PRISM

(75) Inventor: Ki Kyung Jeon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 247 days.

(21) Appl. No.: 14/238,628

(22) PCT Filed: Aug. 22, 2012

(86) PCT No.: PCT/KR2012/006647
§ 371 (c)(1),
(2), (4) Date: Feb. 12, 2014

(87) PCT Pub. No.: WO2013/032165
PCT Pub. Date: Mar. 7, 2013

(65) Prior Publication Data
US 2014/0204208 A1    Jul. 24, 2014

(30) Foreign Application Priority Data

Aug. 31, 2011 (KR) ........................ 10-2011-0088193

(51) Int. Cl.
| | | |
|---|---|---|
| H04N 7/18 | (2006.01) | |
| H04N 5/225 | (2006.01) | |
| H04N 5/232 | (2006.01) | |
| G03B 37/02 | (2006.01) | |

(52) U.S. Cl.
CPC ............. *H04N 7/183* (2013.01); *H04N 5/2259* (2013.01); *H04N 5/23238* (2013.01); *G03B 37/02* (2013.01)

(58) Field of Classification Search
CPC ............................. H04N 7/183; H04N 5/2259
USPC ....................................................... 348/143
See application file for complete search history.

(56) References Cited

U.S. PATENT DOCUMENTS

| | | | | |
|---|---|---|---|---|
| 2002/0057337 | A1* | 5/2002 | Kumler | H04N 5/2254 |
| | | | | 348/47 |
| 2004/0134989 | A1* | 7/2004 | Meier | G06K 7/10574 |
| | | | | 235/462.25 |
| 2010/0036393 | A1* | 2/2010 | Unsworth | A61B 19/22 |
| | | | | 606/130 |

FOREIGN PATENT DOCUMENTS

| | | |
|---|---|---|
| JP | 08-254750 A | 10/1996 |
| JP | 10-136237 A | 5/1998 |
| JP | 2001-033850 A | 2/2001 |
| JP | 2011-048120 A | 3/2011 |
| KR | 10-2010-0138448 A | 12/2010 |

OTHER PUBLICATIONS

International Search Report for International Application No. PCT/KR2012/006647.
KIPO Notice of Allowance for Korean Patent Application No. 10-2011-0088193 which corresponds to the above-identified U.S. Application.
European Search Report for European Patent Application No. 12828865 which corresponds to the above-identified U. S. application.

* cited by examiner

*Primary Examiner* — Richard Torrente
(74) *Attorney, Agent, or Firm* — LRK Patent Law Firm

(57) ABSTRACT

A network camera and an image capturing method using rotating prism are described. The network camera includes a lens module including lenses having incident paths different from each other, a prism reflecting light incident through the lens module, a prism driving module rotating the prism, and a controller controlling the prism through the prism driving module. The prism reflects lights incident through the incident paths different from each other by performing a rotation operation according to a control of the prism driving module.

13 Claims, 1 Drawing Sheet

APPARATUS AND METHOD OF ALTERNATELY CAPTURING IMAGES WITH ROTATING PRISM

TECHNICAL FIELD

The embodiment relates to a network camera. In particular, the embodiment relates to a network camera using a dual lens and a photographing method thereof.

BACKGROUND ART

Recently, news changes are made in visual surveillance cameras such as CCTV cameras. As an example of the changes, network cameras have emerged.

The network camera is called a web camera. The network camera converts images into digital images, compresses the digital images, and transmits the compressed data through a network based on a high-performance embedded system having a CCD camera therein, so that a user can view the images by recovering the images regardless of locations in real time over the Internet.

In addition, among the network cameras, there exists a network camera connected to a network allowing a user to access the network camera through the network, so that the user can receive images to control the movement of the network camera. The network camera has a unique IP address and a server program installed therein, and a remote user is logged in to a server through the unique IP address of the network camera to receive images from the network camera.

In addition, various schemes have been employed for the network camera in order to remove the dead zone of a surveillance region. One of the schemes is based on a fisheye lens, and another scheme is based on a lens equipped with a pan-tilt function.

However, if the fisheye-based lens is employed, a distortion phenomenon may be caused by a short focal length. If the scheme based on the lens equipped with the pan-tilt function is employed, a complex circuit to perform panning and tilting may be required. Accordingly, schemes to effectively remove the dead zone of the network camera are required.

DISCLOSURE OF INVENTION

Technical Problem

The embodiment provides a network camera capable of surveilling the dead zone of a surveillance region by using a dual lens and a photographing method thereof.

In addition, the embodiment provides a network camera capable of providing an input image to an image sensor by rotating a prism and a photographing method thereof.

The technical objects of the present embodiment are not limited to the above object, and other technical objects will be clearly understood by those skilled in the art to which the embodiment suggested in the following description pertains.

Solution to Problem

According to the embodiment, there is provided a network camera including a lens module including a plurality of lenses having incident paths different from each other, a prism reflecting light incident through the lens module, a prism driving module rotating the prism, and a controller controlling the prism through the prism driving module. The prism reflects lights incident through the incident paths different from each other by performing a rotation operation according to a control of the prism driving module.

In addition, the lens module includes a first lens having a first incident path, and a second lens having a second incident path different from the first incident path. The prism reflects the lights incident through the first incident path and the second incident path.

The prism is provided at a point at which the first incident path crosses the second incident path.

In addition, the network camera further includes an image sensor module converting the lights reflected from the prism into an electrical image signal.

Further, the image sensor module converts the light, which is input through the first lens and the prism, into a first image signal, and converts the light, which is input through the second lens and the prism, into a second image signal.

In addition, the network camera further includes a digital signal processing module receiving the first and second image signals obtained through the image sensor module and creating one image frame by combining the first image signal with the second image signal.

In addition, the digital signal processing module creates the image frame by removing an image signal corresponding to an overlap portion of the first and second image signals.

Further, the controller rotates the prism with a number of a rotation per a time unit by controlling the prism driving module.

In addition, the prism driving module rotates the prism so that the light incident through the first lens during a first time is reflected, and the light incident through the second lens during a second time, which is not overlapped with the first time, is reflected according to control of the controller.

Further, the first and second lenses are integrally formed with each other while facing in directions different from each other.

Meanwhile, according to the embodiment, there is provided a photographing method of a network camera including receiving lights incident through incident paths different from each other, reflecting the lights, which are incident through the incident paths different from each other, by rotating a prism, converting the reflected lights into first and second image signals, combining the first and second image signals with each other in a form of one image frame, and transmitting the image frame to a data transceiving part.

In addition, the receiving of the lights incident through the incident paths different from each other includes receiving the light incident through the first incident path, and receiving the light incident through the second incident path different from the first incident path.

In addition, the reflecting of the lights, which are incident through the incident paths different from each other, by rotating the prism, includes reflecting the light incident through the first incident path during a first rotation time according to rotation of the prism, reflecting the light incident through the second incident path during a second rotation time according to the rotation of the prism.

In addition, the converting of the reflected lights into first and second image signals includes generating a first image signal by using the light incident during the first rotation time, and generating a second image signal by using the light incident during the second rotation time.

Further, the first rotation time and the second rotation time are alternately repeated, and the first and second image signals are alternately created according to the first and second rotation times which are alternately repeated.

In addition, the combining of the first and second image signals with each other in the form of one image frame includes removing an overlap portion of the first and second image signals that are alternately created, and combining the first and second image signals without the overlap portion.

In addition, the rotation of the prism is performed with a preset number of rotations per time unit according to control of a controller.

Advantageous Effects of Invention

According to the embodiment of the disclosure, the dead zone of the surveillance region can be removed by using two lenses having orientation angles different from each other.

In addition, images input through two lenses are provided to the same image sensor, so that the images can be stably provided.

Meanwhile, other various effects of the disclosure will be directly or indirectly disclosed in the following detailed description of the disclosure.

MODE FOR THE INVENTION

Figure 1:
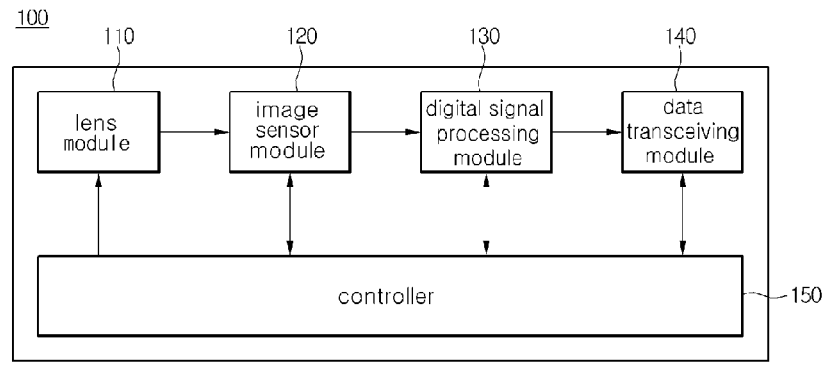
FIG. 1 is a block diagram showing the structure of a network camera according to the embodiment of the disclosure.

The disclosure has various modifications and various embodiments. Hereinafter, specific embodiments will be described in detail with reference to accompanying drawings.

However, those skilled in the art should comprehend that the disclosure is not limited to a specific embodiment, but all modifications, equivalents and alternatives are included in the technical spirit and scope of the disclosure.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention. Similarly, the second component may be named as the first component. In addition, the term and/or refers to the combination of components having the meaning of the plural number or one of the components.

Exemplary embodiments of the disclosure will be described in more detail with reference to accompanying drawings. In the following description, the same reference numerals will be assigned to the same components for the obvious comprehension of the embodiment, and the same components will not be repeatedly described in order to avoid redundancy.

The embodiment of the disclosure provides a network camera capable of removing the dead zone of the surveillance region by using a dual lens.

Hereinafter, the embodiment of the disclosure will be described with reference to accompanying drawings.

FIG. 1 is a block diagram schematically showing the structure of a network camera according to the embodiment of the disclosure.

Referring to FIG. 1, a network camera 100 includes a lens module 110, an image sensor module 120, a digital signal processing module 130, a data transceiving module 140, and a controller 150. Hereinafter, the details of the operation of the network camera 100, which is not related to the disclosure, will be omitted.

The lens module 110 includes two lenses, and takes two images different from each other through the two lenses.

In other words, the lens module 110 may be divided into a first lens to take a first image and a second lens to take a second image different from the first lens.

The image sensor module 120 generates analog data from light input through the lens module 110, and an analog/digital converter module (not shown) converts the analog data, which are output from the image sensor module 120, into digital data.

The analog/digital converter module may not be required due to the characteristics of the image sensor module 120. In this case, the image sensor module 120 may include a charge coupled device (CCD) or a complementary metal oxide semiconductor (CMOS).

The image data output from the image sensor module 120 may be input to the digital signal processing module 130 through a memory (not shown).

In addition, the image data output from the image sensor module 120 may be directly input to the digital signal processing module 130 without passing through the memory.

In addition, the image data may be input to the controller 150 according to the requirement of a user or the specification of the network camera.

In this case, the memory may include at least one of storage media such as a flash memory, a hard disk, a multimedia card micro type memory, a card type memory (e.g., an SD or an XD memory), a RAM, and a ROM (EEPROM).

The digital signal processing module 130 can perform digital signal processing schemes such as a gamma correction scheme and a white balance adjustment.

The image data output from the digital signal processing module 130 may be stored in the memory (not shown) or may be transmitted to the data transceiving module 140.

The data transceiving module 140 transmits the images to a user or a manager in real time through a wired/wireless network.

If the image data are transmitted through the wired network, the data transceiving module 140 converts the image data into a streaming signal suitable for the wired communication and transmits the image data. For example, the wired communication may include at least one of Internet protocols such as a TCP/IP, a UDP/IP, and an RTP based on the Ethernet scheme.

Meanwhile, if the image data are transmitted through the wireless network, the data transceiving module 140 may include one of a Bluetooth scheme, a radio frequency identification (RFID) scheme, an infrared data association (IrDA) communication scheme, a ultra wideband (UWB) scheme, a ZigBee scheme, and a digital living network alliance (DLNA) scheme. In addition, the data transceiving module 140 may employ a communication standard such as a wireless LAN (WLAN; Wi-Fi), a wireless broad band (Wibro), world interoperability for microwave access (Wimax), or high speed downlink packet access (HSDPA).

The controller 150 controls the whole operation of the network camera 100.

In particular, according to the present embodiment, the controller 150 controls operations of taking images different from each other through dual lenses and processing the images by one image sensor module 120.

Figure 2:
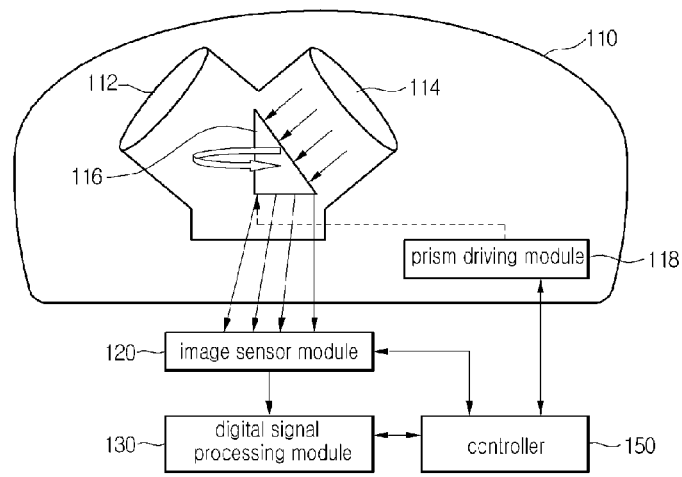
FIG. 2 is a block diagram showing the structure of a lens part according to the embodiment of the disclosure.

FIG. 2 is a block diagram showing the structure of the lens module 110 according to the embodiment of the disclosure.

Referring to FIG. 2, the lens module 110 includes a first lens 112, a second lens 114, a prism 116, and a prism driving module 118.

Meanwhile, although the whole shape of the lens part 110 represents the shape of a dome according to the present embodiment, the disclosure is not limited thereto.

In general, a lens used for a network camera may have the angel of view in the range of 60 to 90. However, the lens module 110 according to the embodiment of the disclosure may acquire the angle of view in the range of 120 to 180 by using two lenses having orientation angles different from each other. In this case, the angle of the view refers to the range of a scene captured by the network camera.

The first and second lenses 112 and 114 may be designed in such a manner that the first and second lenses 112 and 114 are directed differently from each other. For example, as shown in FIG. 2, the first lens 112 may be directed at an angle of 45 degrees toward the left side, and the second lens 114 may be directed at an angle of 45 degrees toward the right side.

In this case, the first and second lenses 112 and 114 are integrally formed with each other to construct a Y-shaped structure.

Through the above structure, the first lens 112 receives light through a first incident path, and the second lens 114 receives light through a second incident path.

The prism (or reflection mirror 116) may be provided at a point where the first incident path meets the second incident path.

The prism 116 supplies light, which has been received through the first incident path or the second incident path, to the image sensor module 120 by reflecting the light.

The prim 116 supplies the light, which has been received through the first incident path or the second incident path, to the image sensor module 120 through the self rotation.

Through the rotation, the prism 160 repeats a process of supplying the light received through the first lens 112 during a first time (or at a first rotation time point) to the image sensor module 120, and supplying the light received through the second lens 114 during a second time (or at a second rotation time point) to the image sensor module 120.

The image sensor module 120 converts light input through the lens module 110 into an electrical signal. In other words, if the image sensor module 120 includes a CCD as an image sensor, the image sensor module 120 converts the light input therein through the lens module 110 into an analog signal. Meanwhile, if the image sensor module 120 includes a CMOS as an image sensor, the image sensor module 120 converts the light input therein through the lens module 100 into a digital signal.

Meanwhile, since images input through the first and second lenses 112 and 114 are not supplied to different image sensor modules 120, but supplied to the same image sensor module 120, the related network camera can stably supply the images.

The digital signal processing module 130 can process a first image signal input through the first lens 112 and a second image signal input through the second lens 114 in the form of one image. In other words, the digital signal processing module 130 can combine the first image signal with the second image signal and remove overlap image signals from the combined first and second image signals. In this case, the overlap image signals refer to image signals created due to an overlap portion of the shooting range of the first lens 112 and the shooting range of the second lens 114.

In other words, the digital signal processing module 130 creates a third image signal by combining the first image signal and the second image signal with each other. Thereafter, the digital signal processing module 130 creates a final third image signal by removing an overlapped image signal from the third image signal.

The digital signal processing module 130 combines the first image signal with the second image signal in the unit of one image frame, and the combined image frame is provided to the data transceiving module 140.

The prism driving module 118 drives the prism 116 in such a manner that the prism 116 can rotate with the preset number of rotations per time unit (rotational speed) under the control of the controller 150. In this case, the prism driving module 118 can rotate the prism 116 by driving a rotational shaft fixed to the prism 116. The rotational shaft is preferably fixed to the prism 116 in perpendicular to the prism 116.

The controller 150 can rotate the prism 116 by controlling the prism driving module 118. In addition, the controller 150 may variably change the rotational speed of the prism 116.

Figure 3:
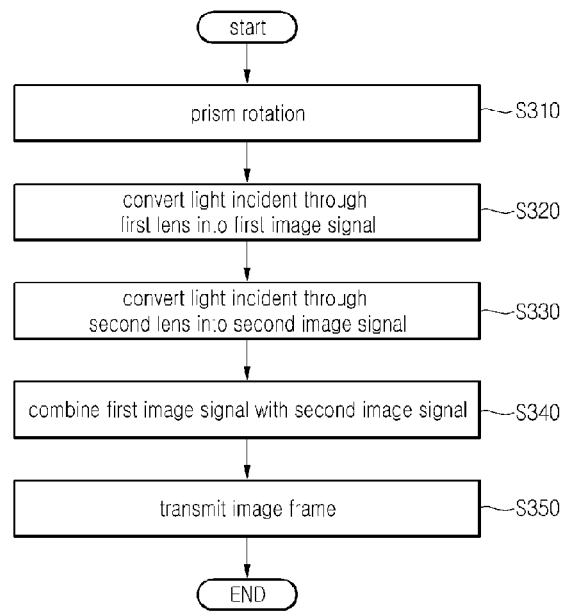
FIG. 3 is a flowchart showing a photographing method of a network camera according to the embodiment of the disclosure.

FIG. 3 is a flowchart showing a photographing method of the network camera according to the embodiment of the disclosure.

Referring to FIG. 3, the controller 150 rotates the prism 116 by the prism driving module 118 in step S310. In this case, the controller 150 controls the prism 116 to rotate the prism 116 at a preset rotational speed.

The controller 150 converts the light incident through the first lens 112 into the first image signal by using the image sensor module 120, and converts the light incident through the second lens 114 into the second image signal by using the same image sensor module 120 in steps S320 and S330. In addition, the first image signal and the second image signal are alternately created according to the rotation of the prism.

In step S340, the controller 150 creates one image frame by combining the first image signal input through the first lens 112 with the second image signal input through the second lens 114.

In step S350, the controller 150 transmits the image frame obtained through the data transceiving module 140 to a user or a manager.

As described above, the network camera according to the embodiment of the disclosure can remove the dead zone of the surveillance region by using two lenses having orientation angles different from each other.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A network camera comprising:
   a lens module comprising a plurality of lenses comprising a first lens and a second lens, the plurality of lenses having incident paths different from each other, the incident paths comprising a first incident path corresponding to the first lens and a second incident lens corresponding to the second lens;
   a prism provided at a point at which the first incident path crosses the second incident path for reflecting light incident through respective ones of the plurality of lenses of the lens module;

a prism driving module rotating the prism for reflecting the light incident through the first lens during a first time, and rotating the prism for reflecting the light incident through the second lens during a second time, which is not being overlapped with the first time; and a controller controlling the prism through the prism driving module, wherein the prism reflects lights incident through the first and second incident paths different from each other by performing a rotation operation, wherein the first and second lenses having narrower angles of view than angles of view of fisheye lenses and are integrally formed with each other to construct Y shape structures, and wherein incident degree of the first incident path and the second incident path is more than 90 degree, respectively.

2. The network camera of claim 1, further comprising:

an image sensor module converting the lights reflected from the prism into an electrical image signal.

3. The network camera of claim 2, wherein the image sensor module converts the light, which is input through the first lens and the prism, into a first image signal, and converts the light, which is input through the second lens and the prism, into a second image signal.

4. The network camera of claim 3, further comprising:

a digital signal processing module receiving the first and second image signals obtained through the image sensor module and creating one image frame by combining the first image signal with the second image signal.

5. The network camera of claim 4, wherein the digital signal processing module creates the image frame by removing an image signal corresponding to an overlap portion of the first and second image signals.

6. The network camera of claim 1, wherein the controller rotates the prism with a number of a rotation per a time unit by controlling the prism driving module.

7. The network camera of claim 1, wherein the first and second lenses are integrally formed with each other while facing in directions different from each other.

8. The network camera of claim 1, wherein each angle of view of the plurality of lenses is ranging from 60 degree to 90 degree.

9. A method for capturing images using a network camera, the method comprising:

receiving lights incident through incident paths from a plurality of lenses comprising a first lens and a second lens, incident paths comprising a first incident path and a second incident path which being different from each other;

reflecting the received lights incident using a prism provided at a point at which the first incident path crosses the second incident path;

rotating the prism for reflecting the light incident corresponding to the first incident path during a first rotation time, and rotating the prism reflecting the light incident corresponding to the second incident path during a second rotation time, which is not being overlapped with the first time;

converting the reflected lights which corresponding to the first and second incident paths during the first and second time into first image signal and second, image signal, respectively;

combining the first image signal with the second image signals in a form of one image frame; and transmitting the combined image frame, wherein the first and second lenses having narrower angles of view than angles of view of fisheye lenses and are integrally formed with each other to construct Y shape structures, and wherein incident degree of the first incident path and the second incident path is more than 90 degree, respectively.

10. The method of claim 9, further comprising:

generating a first image signal by using the light incident during the first rotation time;

and generating a second image signal by using the light incident during the second rotation time.

11. The method of claim 10, wherein the first rotation time and the second rotation time are alternately repeated, and the first and second image signals are alternately created according to the first rotation time and the second rotation time which are alternately repeated.

12. The method of claim 9, wherein the rotating the prism is performed with a preset number of rotations per a time unit according to control of a controller.

13. The method of claim 9, further comprising:

removing an overlap portion of the first and second image signals that are alternately created; and combining the first and second image signals without the overlap portion.

* * * * *